United States Patent [19]

Misu et al.

[11] Patent Number: 4,665,693
[45] Date of Patent: May 19, 1987

[54] HYDRAULIC TORQUE CONVERTER

[75] Inventors: Takahiro Misu; Fumio Nakagawa, both of Aichi, Japan

[73] Assignee: Aisin Seiki Kabushiki Kaisha, Kariya, Japan

[21] Appl. No.: 703,487

[22] Filed: Feb. 20, 1985

[30] Foreign Application Priority Data

Mar. 23, 1984 [JP] Japan ............................. 59-40386[U]

[51] Int. Cl.$^4$ ............................................ F16D 33/00
[52] U.S. Cl. ....................................... 60/330; 60/367; 416/180
[58] Field of Search ................. 60/330, 366, 350, 367; 416/180, 186 R; 29/156.8 FC; 45/211

[56] References Cited

U.S. PATENT DOCUMENTS 2,453,524 11/1948 McMahan et al. ................. 415/211
3,873,237 3/1975 Tokunaga ........................... 416/180
4,376,370 3/1983 Kinugasa et al. .................... 60/367

Primary Examiner—Lloyd L. King
Attorney, Agent, or Firm—Burns, Doane, Swecker & Mathis

[57] ABSTRACT

A hydraulic torque converter comprising an impeller integral with an input shaft and a rotor which is integral with an output shaft and opposed to said impeller so that a given clearance is formed therebetween, notches which are formed at one circumferential end of the inner periphery of vanes defining outlets of oil passages of the impeller, and notches at circumferential ends of the inner and outer peripheries of the rotor vanes defining inlets of oil passages of the rotor.

12 Claims, 4 Drawing Figures

FIG. I (PRIOR ART)

HYDRAULIC TORQUE CONVERTER

BACKGROUND

The present invention relates to a hydraulic torque transmitting apparatus and more particularly to a hydraulic torque converter which is mounted on an automatic transmission for automotive vehicles or the like.

A hydraulic torque converter in which power from an engine is once converted into kinetic energy of a fluid and the energy is then taken out as torque is disclosed for example in U.S. Pat. No. 3,165,946 as shown in FIG. 1.

Such a hydraulic torque converter generally forms an automatic transmission with a planetary gear set and a gear shift control device and is adapted to smoothly transmit power from an engine to a propeller shaft and the like via the planetary gear set.

A crank shaft, that is, and input shaft (not shown) of an engine is connected with a drive plate boss 1a of an impeller 1. The other output shaft (not shown) is connected with a boss 2a which is integral with a turbine rotor 2. The impeller 1 and the rotor 2 are disposed so that they oppose each other with a given clearance $\delta_1$ (for example 3 mm) at the outer periphery thereof.

In other words, a shell 3 of the impeller 1 which is in the form of a half torus is provided with a plurality of (for example 24) radially extending vanes 4 projecting from the inner periphery 3a thereof within the inner space thereof. The vanes (or blades) 4 are retained between the shell 3 and a half torus-shaped core ring 5 which is disposed within the shell 3. Another half torus-shaped shell 8 of the rotor 8 which opposes to the shell 3 is similarly provided with a plurality of radially extending vanes 7 projecting from the inner periphery 8a' thereof within the inner space thereof. These vanes 7 are retained between the shell 8 and a half torus-shaped core ring 9.

A stator 11 having radially extending vanes 10 is disposed on and around a one-way clutch which is positioned on the output shaft (not shown) axially between the impeller 1 and the rotor 2 and at the radially central space.

When the input shaft is rotated in synchronization with the engine, the impeller 1 directly fixed to the input shaft is also rotated integral with the input shaft. Oil within the shell 3 is also rotated by being propelled by the vanes 4 so that the oil is forced to move in a radially outer direction by generated centrifugal force. Oil in the central space of the shell 3 is also successively forced to move to the radially cuter periphery. Accordingly the oil which has been moved to the radial outer periphery of the shell is expelled into the inside of the shell 8 of the rotor 2 after passing through the clearance $\delta_1$. At this instant, the influent oil into the rotor 2 impinges upon the vanes 7 so that the resulting impact force causes the rotor 2 to rotate in the same direction as that of the impeller 1. The oil which has impinged upon the vanes 7 flows along the vanes radially inward and toward the stator 11. Oil coming out of the stator 11 flows again within the shell 3 of the impeller in the radially outward direction. The reaction force of the influent oil further increases the rotation torque of the impeller 1.

In the hydraulic torque converter, the kinetic energy of the oil from the rotor 2 is effectively utilized by the impeller by rectifying the flow direction of the oil by the vanes 10 of the stator 11 so that the more the difference between the rotational speeds of the impeller 1 and the rotor 2 becomes, the more the rotation torque of the rotor 2 increases.

Upon assembly of the hydraulic torque converter, the vanes 4 (or 7) are secured and sandwiched by and between the shell 3 (or 8) and the inside core ring 5 (or 9), respectively. Thereafter the outer peripheral end 8a of the shell 8 and the outer peripheral end 5a (or 9a) of the core ring 5 (or 9) are machined so that the outer peripheral ends 5a and 9a of the core rings 5 and 9 will not contact or interfere each other on rotation, and a given clearance $\delta_1$ is assured between the ends (4a and 7a) of the vanes 4 and 7.

However when the outer peripheral ends 5a and 9a of the core rings are machined, the corners of the vane ends 4a and 7a are readily damaged by for example the contact with a cutting tool. In order to positively avoid such damages, it should be designed so that the opposite vane ends 4a and 7a are preliminarily sufficiently set back from the outer peripheral end 8a of the shell 8 or the outer peripheral ends 5a and 9a of the core ring. Accordingly the clearance $\delta_1$ between the impeller 1 and the rotor 2 becomes wider ($\delta_1 > \delta_2$ in the drawing) so that a problem rises that the rotor efficiency is remarkably decreased due to the leakage of the oil through the clearance $\delta_1$.

SUMMARY OF THE DISCLOSURE

It is therefore an object of the present invention to provide a novel hydraulic torque converter.

It is another object of the present invention to provide a hydraulic torque converter in which the damages of the vanes can be positively avoided when the impeller and the rotor are machined while a clearance between the outlet end of the oil passage of the impeller and the inlet end of the oil passage of the rotor is minimized so that the decrease in turbine efficiency due to oil loss in a passage is avoided.

In accordance with the present invention, the vanes of the impeller are provided with notches at one circumferential end of the inner peripheries of the vanes which define outlets of the oil passages for the impeller, and the vanes of the rotor are provided with notches at the circumferential ends of the inner and outer peripheries of the vanes which define inlets of the oil passages for the rotor.

By these provisions, the cutting tool will not abut to the vanes since the tip of the cutting tool will freely move through the notches to avoid the damages of the vanes when the outer peripheral ends of the shell and the core ring are machined after the vanes have been sandwiched between the inner peripheral surface of the shell of the impeller and the outer peripheral surface of the core ring.

Therefore it enables to align the outer peripheral ends of the machined annular shell and core rings, and the circumferential ends of a plurality of vanes on a substantially same plane to which the axis of the input or output shaft is normal. As a result of this, the clearance between the impeller and the rotor may be minimized at a high precision when the impeller and the rotor are assembled to oppose to each other.

Although the notches are formed only at the circumferential ends of the inner periphery (end of the inner peripheral side) of the vane ends corresponding to the oil passage outlets of the impeller, no notches are formed at the circumferential ends of the outer peripheries thereof. This is on the one hand because provision of the notches at the circumferential end of the outer periphery of the impeller vanes is not needed due to the shell structure which requires no machining after assembling the vanes, and on the other hand because high kinetic energy possessed by oil at the outer periphery of the impeller where the oil speed is increased due to centrifugal force should be efficiently transmitted to the rotor.

The torque converter to which the present invention can be applied encompasses also multiple stage torque converters.

DETAILED DESCRIPTION OF THE PREFERRED EMBODIMENTS

Figure 1:
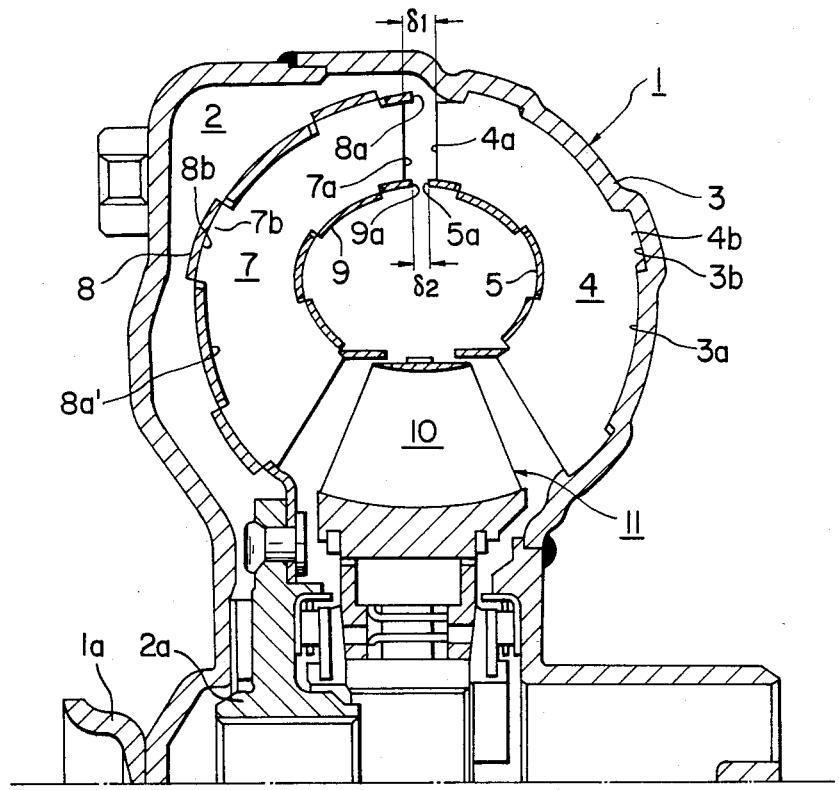
FIG. 1 is a sectional view showing a half of an conventional hydraulic torque converter.

The present invention will be described by way of embodiments with reference to the drawings. Substantially same parts as those in FIG. 1 are designated by like reference numerals.

Figure 2:
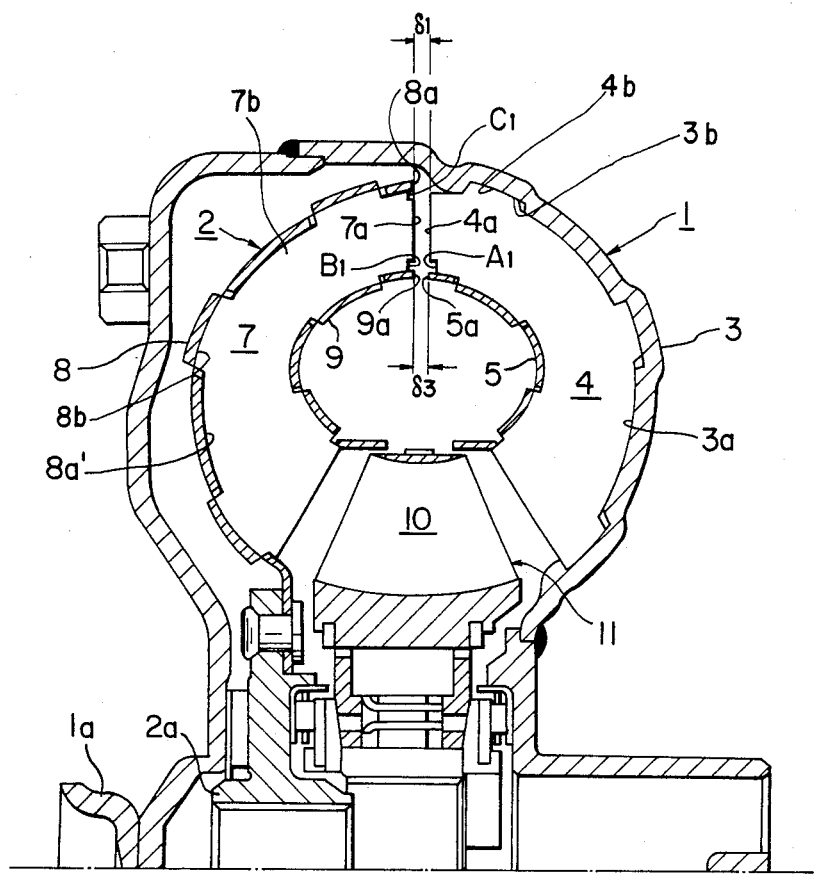
FIG. 2 is a sectional view showing an embodiment of the present invention.

Referring now to FIG. 2, a half torus of shell 3 of the impeller 1 is provided with radially extending, for example, 24 vanes at the inner peripheral surface thereof by engaging protruded portions 4b of the vanes 4 with recesses 3b of the shell 3. The vanes 4 are secured and sandwiched by and between the shell 3 and the inner annular core ring 5. Rectangular notches $A_1$ (only a single notch is shown in the drawing) are formed at the circumferential end of the inner periphery of the vanes which are located at the oil passage outlets of the vanes 4, and the outer peripheral end 5a of the core ring 5 is machined so that it is aligned with the extention of the vane ends 4a in a centripetal direction.

In a similar manner, a half torus of shell 8 of the rotor 2 is provided with radially extending 24 vanes at the inner peripheral surface thereof and the vanes 7 are positioned and retained between the shell 8 and the inner core ring 9 by engaging protruded portions 7b of the rotor vanes 7 with recesses 8b of the shell 8.

Notches $B_1$ and $C_1$ having a shape substantially identical with that of the notches $A_1$ are formed at ends of the inner and outer peripheries, respectively, which are located at the inlet of each oil passage between the vanes 7. In this case, the notches $A_1$ and $B_1$ oppose to each other corresponding to the neighboring clearance $\delta_3$ between the vane ends 4a and 7a. The outer peripheral ends 9a (and 8a) of the core ring 9 (and the shell 8) are machined so that the periperal ends 9a and 8a of the core ring 9 and the shell 8 and the vane ends 7a of the vanes 7 are on a plane to which the axis of the input or output shaft (not shown) is normal.

Since the components of the converter are arranged in such a manner, the notches $A_1$, $B_1$ and $C_1$ provide spaces through which the tip edge of the cutting tool can freely move so that the vane ends 4a and 7a of the vanes 4 and 7 are prevented from being damaged during machining the core rings 5 and 9 and the shell 8.

When the vanes 4 and 7 are formed by pressing, the notches $A_1$, $B_1$ and $C_1$ are formed simultaneously with the pressing. The provision of the notches $A_1$, $B_1$ and $C_1$ enables the outer peripheral ends 9a, 5a of the core rings, the vane ends 7a, 4a of the vanes and the outer peripheral end 8a of the shell to be on the same plane as shown in FIG. 2. Thus the clearance $\delta hd 1$ between the vanes 4 and 7 may be precisely preset to a minimum value. In accordance with the present invention, the clearance may be 1–3 mm.

Figure 3:
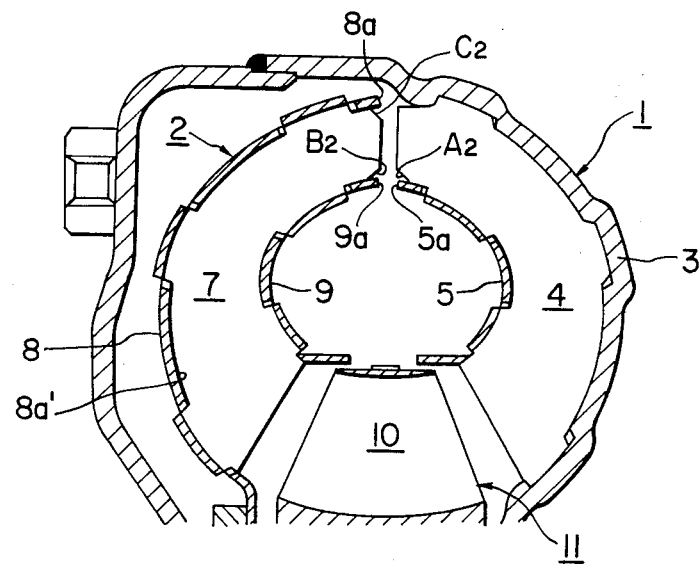
FIGS. 3 and 4 are sectional views showing further embodiment of the present invention.
Figure 4:
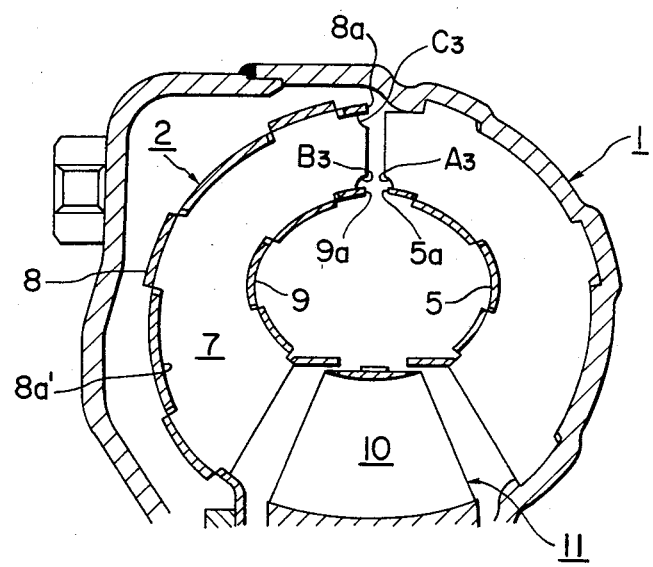

FIGS. 3 and 4 show other embodiments of the present invention. In FIG. 3 the notches $A_2$, $B_2$ and $C_2$ have a linear profile. In FIG. 4 the notches $A_3$, $B_3$ and $C_3$ are quadrant. The other components are identical with those of FIG. 1. Functions and effects identical with those of FIG. 1 are performed.

The notch which constitutes the features of the present invention is not limited to the shapes of those embodiments and may have any shape so far as it provides a space through which a cutting tool can freely move.

As described hereinabove in accordance with the present invention, the notches are provided at specific positions where the vanes of the impeller and rotor oppose to each other for preventing the vanes from being damaged upon machining. Accordingly the vane ends of the opposing vanes are disposed closer each other than prior art so that the clearance between the vanes of the impeller and the rotor may be decreased (oil passages may be extended) whereby an effect is obtained that the loss in the passages on rotation may be minimized. There is provided another effect that the converter may be manufactured without increase in the manufacturing cost per vane since the notches of the vane may be formed by pressing simultaneously with pressing of the vane.

It should be noted that the present invention is not limited to the embodiments herein disclosed and modifications may be made within the concept and scope of the present invention as disclosed and claimed hereinbelow.

What is claimed is:

1. A hydraulic torque converter comprising:
   an impeller which is integral with an input shaft and provided with vanes defining oil passages therein terminating with outlets thereof,
   a rotor which is integral with an output shaft, disposed opposed to said impeller with its inlets being opposed with a given clearance to the outlets of the impeller, and provided with vanes defining oil passages therein extending from said inlets, and
   a stator disposed at the radially central portion of a space between said impeller and rotor for deflecting oil flow from said rotor to said impeller depending upon the rotational conditions of said impeller and rotor,
   wherein the improvement comprises:
   notches provided at one circumferential end of the inner periphery of the impeller vanes defining the outlets of the oil passages of the impeller, and
   notches provided at the circumferential ends of the inner and outer peripheries of the rotor vanes defining the inlets of the oil passages of the rotor.

2. A hydraulic torque converter as defined in claim 1, in which the impeller vanes are secured and sandwiched by and between an impeller shell and a ring core disposed within the shell, and the circumferential vane ends at the outlets are aligned with the outer peripheral end of the ring core to the axis.

3. A hydraulic torque converter as defined in claim 2, in which the rotor vanes are secured and sandwiched by and between a rotor shell and a ring core disposed therein, and the circumferential vane ends at the inlets are aligned with the outer peripheral ends of the rotor shell and the ring core.

4. A hydraulic torque converter as defined in claim 2, in which said alignment is in a plane normal to the axis of the input shaft.

5. A hydraulic torque converter as defined in claim 3, in which said alignment is in a plane normal to the axis of the input shaft.

6. A hydraulic torque converter as defined in claim 1, in which said notches are rectangular.

7. A hydraulic torque converter as defined in claim 1, in which said notches are rectlinear.

8. A hydraulic torque converter as defined in claim 1, in which said notches are quadrants.

9. A hydraulic torque converter as defined in claim 2, in which said outer peripheral end of the ring core has been machined to such an extent that provides the alignment after the ring core and the vanes had been assembled to the shell.

10. A hydraulic torque converter as defined in claim 3, in which said outer peripheral ends of the rotor shell and the ring core have been machined to such an extent that provides the alignment after the ring core and vanes had been assembled to the rotor shell.

11. A hydraulic torque converter as defined in claim 2, in which said ring core is in a form of a half torus.

12. A hydraulic torque converter as defined in claim 3, in which said ring core is in a form of a half torus.

* * * * *